3,478,971
PROCESS AND APPARATUS FOR BREAKING UP A HEAP OF CEREAL OR LEAF CROP
Ernst Weichel, Bahnhofstrasse 1, Heningen uber Goppingen, Germany
Filed Oct. 2, 1967, Ser. No. 672,070
Claims priority, application Germany, Oct. 3, 1966, W 42,510
Int. Cl. B02c 7/02, 18/00, 23/00
U.S. Cl. 241—24                                                    20 Claims

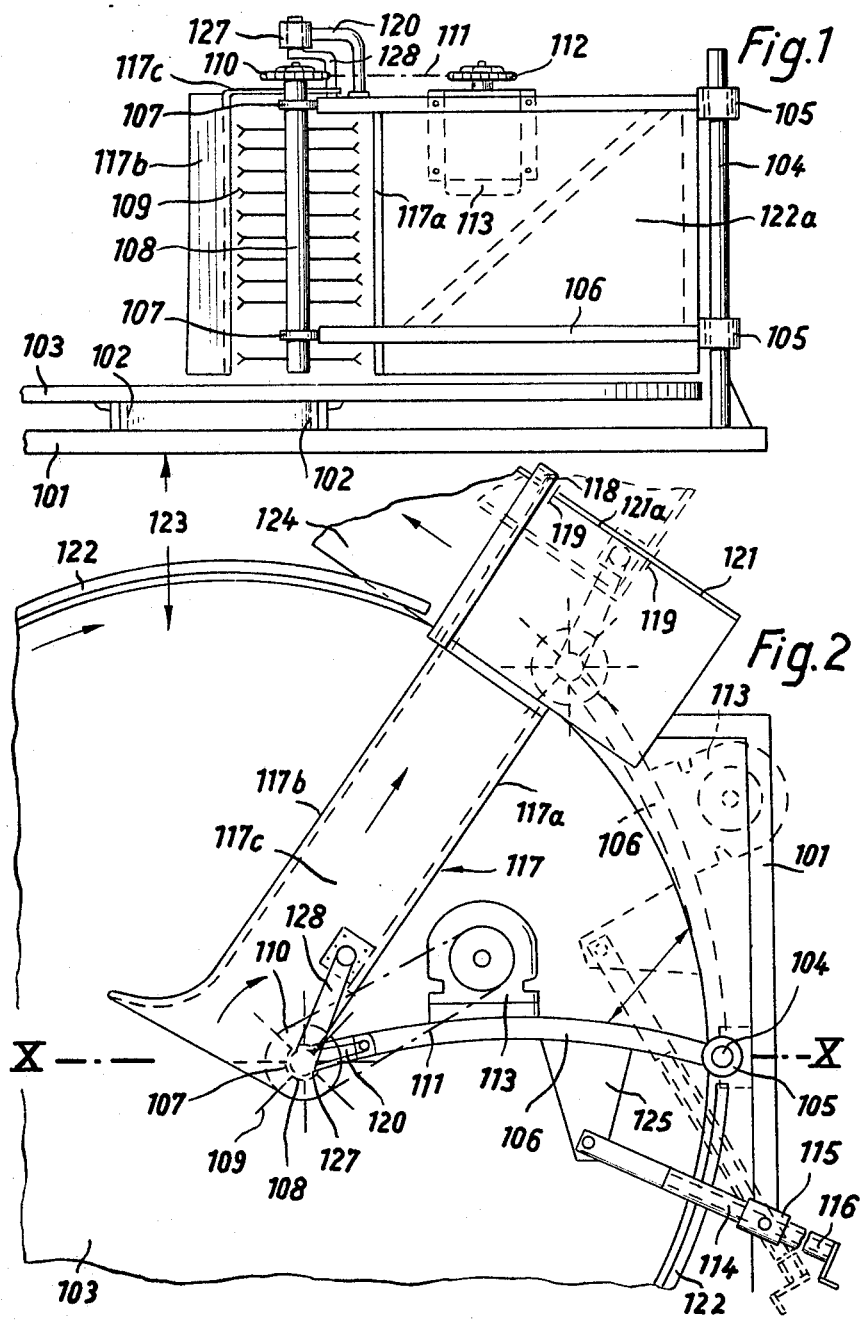

ABSTRACT OF THE DISCLOSURE

The present invention discloses a process and apparatus for gradually breaking up a heap of cereal or leaf crop, the heap of cereal or leaf crop being on a rotating turntable with a separator or cutter arranged together with a conveyor to engage the outer surface of the heap, thus cutting, separating and conveying away the cereal or leaf crop.

---

Known methods and machines of this kind involve great structural expense, they operate differently for different kinds of material, and they are susceptible to failure. Further, they involve considerable labour costs, and the remaining manual labour is too strenuous.

This is due to the fact that, with the conventional harvesting machines of today (loading wagons for example by which large quantities of hay, straw or green fodder (silage fodder) are conveyed to the farmyard in rapid succession), large masses of commodity accrue hourly and then, as a general rule, they have to be delivered to suitable conveyor arrangements such as blowers, blower-choppers, and other processing machines. Since this delivery operation has to be carried out continuously throughout, and in as regular a manner as possible, the large, partially compressed heaps have to be converted into a continuous flow of commodity. This problem is difficult to solve not only under hand operation, but even the known technical devices provide an unsatisfactory solution. This applies particularly to all those arrangements which deliver the unloaded masses of long commodity to a so-called dosing or metering device (which usually has moving and fragmentating elements) by conveyor belts or scraper chains. The dosing or fragmentating operations require forces of different strength, different rotational speeds and conveying speeds according to the material involved an example of this being the differene in quality between short grass and hay, straw, heavy clover, or even long silo maize. Thus it is virtually impossible for devices of this kind to run automatically.

In a known arrangement, the unloaded commodity is placed on a rotating platform which is surrounded by a stationary container wall and has cutters acting at its outer rim which pare a continuous sliver of commodity from the rotating mass and conduct it outwardly. Even in this known arrangement somewhat complicated devices are required to convey the commodity from the interior part of the rotating platform to the outside into the region of the cutters.

The object of the invention is to eliminate the disadvantages of the known arrangements, and particularly to modify and improve the known arrangement having a rotating platform, so that it is possible to temporarily store the heap of unloaded commodity and subsequently carry it away continuously, preferably in a fragmentated state, either by a single operator or fully automatically, so that simple conveyor belts or conveyor or cutter blowers suffice as following machines, the provision of so-called exact blower choppers being unnecessary.

According to the present invention an improved method for gradually breaking up a rotating mass of cereal or leaf crop from the outside and further conveying the separated commodity wherein the improvement comprises a mobile separating or fragmentating device being moved towards the outer surface of the rotating mass from the outside this device then being maintained in contact with the outer surface of the gradually reducing mass by an adjusting movement directed substantially towards the centre of the mass, and the commodity removed from the outer edge being continuously conducted towards the outside away from the region of rotation of the mass.

Preferably, the apparatus for carrying out this method is constructed with a rotating turntable as the carrying surface for the mass of cereal or leaf commodity and with a separating or fragmentating device, so that the separating or fragmentating device is arranged on a carrying frame which is movable from the outside to the inside above a turntable and connected to a deflector for guiding the separated commodity from the inside to the outside. Preferably, the separating or fragmentating device extends across the full height of the mass of cereal crop.

Preferably, the carrying fame is constructed as an inwardly pivotable part of the rotationally symmetric container wall surrounding the turntable.

Advantageously, a tunnel having an inlet opening near the separating device and an outlet opening in the region of a conveyor device is built on the free end of the carrying frame and serves to guide the outwardly conveyed, preferably outwardly centrifuged, commodity.

The present invention will now be further described by way of example, with reference to the accompanying drawings, in which:

FIG. 1 is a fragmentary cross section, taken on the line X—X in FIG. 2, through an arrangement constructed in accordance with the invention, FIG. 2 is a fragmentary plan view corresponding to the illustration in FIG. 1, having additional parts, i.e. parts not visible in FIG. 1.

A track ring 102 carrying a rotating turntable 103 is secured to a fixed or mobile frame 101. Alternatively, the turntable 103 can be mounted on the frame 101 by other means. A substantially vertical column 104 is secured to the frame 101 outside the orbital track of the outer edge of the turntable 103. A carrying frame 106 pivotable in bearings 105 is articulated to the column 104, and a part 122a of the fixed defining wall 122 of a dosing or metering device 123 may be secured thereto. As illustrated in FIG. 1, a diagonal strut of the carrying frame 106 (indicated by dashed lines) is located behind the movable container wall part 122a.

The greatest portion of the defining wall 122 is rigidly connected to the frame 101. However, it can be entirely or partially supported on the ground or, for the purpose of providing a filling opening for the container 123, it may be temporarily or permanently removable.

Fixed or movable tines 109 or cutting elements of different construction are mounted on a shaft 108 rotating in two bearings 107 located on the free end of the carrying frame 106. The shaft 108 is driven at a constant or variable speed in the direction of the arrow by a pulley or sprocket wheel 110 located on its upper end, by a drive means 111 (a chain in the embodiment illustrated), and a drive wheel 112 couplable directly to a motor 113. Thus, for a part of their orbit, the tines 109 come into contact with the material located on the turntable 103 rotating in the direction of the arrow. They sever or tear the material and throw or push it towards the outer edge of the turntable 103. The detached commodity (without parts of it flying about) thereby passes through a tunnel 117 formed by a side wall 117a a second side wall 117b and a cover 117c for example, into the receiving trough of a conveyor 124 or against a fixed rebound plate 121 from which the commodity falls back into the receiving trough of the conveyor 124. The conveyor 124 carries the commodity in a continuous stream to a storage space, a manger, or an additional conveyor or processing device.

In accordance with the invention, the tunnel 117 is supported on a retaining arm 120 secured to the carrying frame 106 and terminating in a pivotal point 127 advantageously arranged concentrically to the cutter shaft 108. A bracket 128 rigidly connected to the tunnel 117 is pivotably suspended in the pivotal point 127, so that in every position of the cutter shaft 108 the tunnel 117 maintains substantially the same radial position relative to the orbit of the cutters 109, and the same vertical distance relative to the surface of the turntable 103. There is a gap in the container wall 122 in the region of the tunnel 117. The outer end of the tunnel 117 is connected to an angular guide bracket 119 longitudinally displaceable in a guide groove 119 in the rebound plate 121. Thus, the tunnel 117 can participate in the pivotal movements of the frame 106 and be displaced in the guide groove 119, the tunnel remaining in its horizontal plane in all its different positions. It extends to a greater or lesser degree beyond the rebound plate 121 only in the outer positions. In their outer positions the side walls 117a and 117b can emerge laterally through further slots 119 in the rebound plate 121, whereas, in the same positions, the upper cover 117c is supported on the upper edge 121a of the rebound plate 121.

Before the dosing or metering device is filled, the carrying frame 106 assumes its outer position illustrated by dashed lines. A spindle 114 co-operating with a spindle nut 115 pivotably secured to the frame 101 engages on a bracket 125 (illustrated only in FIG. 2) mounted on the upper edge of the carrying frame 106. Thus, the carrying frame 106 may be pivoted continuously or intermittently about the column 104, so that during the cutting operation the cutters 109 can adapt themselves to the continuously reducing diameter of the mass. The separating device 108, 109 provided on the carrying frame 106 gradually moves towards the centre of the turntable during the emptying operation into the position illustrated by solid lines in FIG. 2 in which the turntable is virtually completely cleared of the commodity.

In a modification of the illustrated embodiment, the carrying frame may also be subjected to the action of a tension spring (not illustrated) drawing it inwardly in a similar direction as the spindle 114. Preferably, a feeler roller (not illustrated) of a kind known per se rotating about a vertical axle is secured in an adjustable manner to the carrying frame 106 or to the wall 117b of the tunnel 106, in front of the orbital region of the tines 109. The feeler roller rolling on the outside of the rotating mass of commodity holds the cutters 109 arranged on the carrying frame 106 in a uniform working position on the heap of commodity, since the carrying frame 106 is continuously moved towards the center of the turntable by the tension spring. Thus, the uniform cutting away of the mass is achieved in a simple manner. By way of example, the tension spring may be supplemented or replaced by a cable and a counter-weight secured thereto.

In accordance with the invention, the spindle 114 to be operated manually by the crank 116 (in the manner illustrated in the drawing) may be replaced by a turning gear drivable by a motor and whose technical details are known per se. This turning gear may be driven in a very simple manner by a friction roller running on the outer edge of the turntable, for example. Thus, after the container has been filled, and at each revolution of the turntable 103, the carrying frame 106 is pivoted relative to its initial position at the outer periphery of the turntable 103 slightly towards its end position in the vicinity of the centre of the turntable 103. In this end position, a limit switch (not illustrated) may be automatically actuated which stops the entire installation.

METHOD OF OPERATION

At the commencement of the fragmentating operation, i.e. when the container is substantially full, the carrying frame is located in the position illustrated by dashed lines, so that the tips of the conveyor tines 109 extend just to the edge of the turntable 103. In this position, the entire tunnel 117 is also located outside the turntable 103. When the turntable 103 loaded with the commodity is rotated at a moderate speed, and the cutter shaft 108 rotated at a cutting speed corresponding to the construction of the tines 109, a thin layer of commodity (under fragmentation if necessary) corresponding to the depth to which the cutters plunge into the commodity is pared from the outer edge of the rotating mass of commodity and pushed towards the outer part of the turntable or thrown in free flight directly into the receiving trough of the conveyor belt 124. The throwing operation is necessary in the case of long commodity tending to coil or twist, and becomes more preferable the higher the selected cutting speed of the shaft 108. Preferably, the shaft 108 is fitted in the frame 106 so that it slightly inclines relative to the vertical plane. Thus, in any position, its upper end is nearer than its lower and to the vertical, imagined axis of rotation of the turntable 103 (measured in the horizontal plane).

By varying the rotational speed of the turntable and the cutting speed of the tines 109, or by altering the adjusting speed of the frame 106, the speed of the cutting operation (i.e. the depth to which the cutters 109 plunge into the mass of commodity and the degree of fragmentation of the commodity) may be varied within a wide range. In the case of very tough material for example, and at the expense of the time required to empty the container, it is advantageous for the spindle 114 to be set for a short feed, so that, despite the tough material, the apparatus may be operated with low power consumption. In other cases, by selecting a high cutting speed in conjunction with a short feed a substantial pulping of the commodity is obtained. A lesser or even a coarse fragmentation of the commodity is obtained by selecting a long feed, a greater rotational speed of the turntable and/or a lower speed of the shaft 108.

In accordance with the invention, regulating and switching devices known per se (not illustrated in detail here) may be used to synchronize the rotational speeds of the cutters 109, and the turntable 103, so that the turntable 103 rotates more rapidly as the cutters 109 approach the centre of the turntable 103. An automatic regulating arrangement of this kind (whose construction is familiar to the expert) enables a uniform peripheral speed of the outer edge of the continuously reducing mass to be maintained in an advantageous manner during the entire emptying period of the container 123, so that uniform quantities of the commodity are delivered to the following devices. As soon as the shaft 108 or the carrying frame 106 has reached the position to be defined by stops (not illustrated) and located nearest to the centre of the turntable the turntable is free from the commodity. If the installation is switched off in this position by automatic limit switches, the operation of the installation can be taken over exclusively by the workers bringing fresh successive loads of commodity from the fields at certain intervals of time. The fresh loads are discharged by the instantaneous unloading method into the at least partly empty container 123. Thus, during silaging for example, hitherto unheard-of load per worker are possible with only one tractor and one loading wagon.

The operating periods, i.e. the duration of the operation of the turntable 103, the cutters 109, and the conveyor 124, may be made dependent upon the feeding times for example, instead of being dependent upon the full or empty state of the container 123. The operation of the entire apparatus may thereby be so-called time switches. Thus, optional supplies of fodder intermediately stored in the dosing device 123 may be automatically delivered in specific quantities and at predetermined times to mangers and fodder containers for example by the conveyor 124, and if required, fragmentated or mixed. The latter requires the container to be filled with different kinds of fodder at the same time. This has the great advantage that any necessary fragmentation can be undertaken without any manual work immediately before feeding. Thus, conversion operations (fermentation, heating, changes in odour and colour etc.) previously regarded as unavoidable may be eliminated. Thus, the fodder can be stored in the best possible state of aggregation.

Thus, the invention achieves a considerable technical advance with respect to economy in construction and labour requirements, as well as a general improvement in the quality of animal fodder.

I claim:

1. An improved method for gradually breaking up a rotation mass of cereal or leaf crop from the outside and further conveying the separated commodity wherein the improvement comprises a mobile separating or fragmentating device being moved towards the outer surface of the rotating mass from the outside, this device then being maintained in contact with the outer surface of the gradually reducing mass by an adjusting movement directly substantially towards the centre of the mass, and the commodity removed from the outer edge being continuously conducted towards the outside away from the region of rotation of the mass.

2. An improved apparatus for gradually breaking up a rotating mass of cereal or leaf crop from the outside and further conveying the separated commodity, having a rotating turntable as a carrying surface for the mass of cereal crop, and a separating or fragmentating device, wherein the improvement comprises the separating or fragmentating device being arranged on a carrying frame movable from the outside to the inside above the turntable which carrying frame is connected to a deflector for guiding the separated commodity from the inside to the outside.

3. An apparatus according to claim 2, wherein the separating or fragmentating device extends across the entire height of the mass.

4. An apparatus according to claim 3 wherein the carrying frame is constructed as an inwardly pivotable part of a rotationally symmetric container wall surrounding the turntable.

5. An apparatus according to claim 4 wherein an opening in the container wall for the outward egress of the commodity is arranged contiguous to the free end of the pivotable part.

6. An apparatus according to claim 5 wherein a tunnel for guiding the outwardly conveyed, preferably outwardly centrifuged, commodity is built on the free end of the carrying frame the inlet opening of which tunnel is arranged in the vicinity of the separating device and its outlet opening arranged in the region of a conveyor arrangement.

7. An apparatus according to claim 6 wherein the tunnel is longitudinally displaceable in recesses in a rebound wall defining the effective length of the tunnel at any given time.

8. An apparatus according to claim 7 wherein the pivotable part of the container wall is constructed as a carrying frame both for the separating or cutting elements and their drive and for the securing means carrying the tunnel.

9. An apparatus according to claim 8 wherein a positively actuated drive preferably involving the use of a screw-threaded spindle, is provided for pivoting the carrying frame and the separating device connected thereto.

10. An apparatus according to claim 8 wherein a spring is provided for inwardly pivoting the carrying frame and automatically and continuously causes the free end of the carrying frame or the separating device to follow the outer layer of the (constantly reducing) mass.

11. An apparatus according to claim 9, wherein a variable speed gear is fitted into the turntable drive for the purpose of obtaining a substantially uniform quantity of conveyed commodity and automatically increases the rotational speed of the turntable with increasing adjusting movement.

12. An apparatus according to claim 11, wherein a cutter roller or a centrifugal roller having a substantially vertical axis is provided as the separating element.

13. An apparatus according to claim 12, wherein the axle of the separating device deviates from the vertical direction, so that the upper portion of the axle is inclined towards the turntable.

14. An apparatus according to claim 11, wherein the separating element comprises reciprocating cutters.

15. An apparatus according to claim 11, wherein the separating element is provided with vertically and horizontally disposed discs.

16. An apparatus according to claim 11, wherein the separating element is provided with vertically or horizontally disposed discs.

17. An apparatus according to claim 15 wherein guide ribs are provided on the turntable.

18. An apparatus according to claim 17 wherein guide ribs are provided on the tunnel or on the carrying frame.

19. An apparatus according to claim 18, wherein the separating device is connected to a feeler device whose feeler roller runs on the outer layer of the mass and maintains the axle of the separating device at a uniform distance from the outer surface of the mass.

20. An apparatus according to claim 19 wherein for obtaining varying degrees of fragmentation of the commodity, the separating device is provided with an arrangement for controlling its rotational speed and/or the adjusting speed of the carrying frame.

References Cited

UNITED STATES PATENTS 2,794,560    6/1957    Buschbom _____ 241—186

GERALD A. DOST, Primary Examiner

U.S. Cl. X.R.

241—63, 185